United States Patent
Powell et al.

(10) Patent No.: US 6,604,368 B1
(45) Date of Patent: Aug. 12, 2003

(54) R 12 REPLACEMENT REFRIGERANT

(75) Inventors: Richard L. Powell, Cheshire (GB); John Edward Poole, Cheshire (GB); John Derek Capper, Cheshire (GB); James Victor Thomas, Nova Scotia (CA)

(73) Assignee: Refrigerant Products, Ltd., Manchester (GB)

( * ) Notice: Subject to any disclaimer, the term of this patent is extended or adjusted under 35 U.S.C. 154(b) by 143 days.

(21) Appl. No.: 09/678,473

(22) Filed: Oct. 2, 2000

Related U.S. Application Data

(63) Continuation-in-part of application No. 09/570,829, filed on May 12, 2000.
(60) Provisional application No. 60/157,692, filed on Oct. 4, 1999.

(51) Int. Cl.$^7$ ................................................. F25D 25/00
(52) U.S. Cl. ........................... 62/114; 62/114; 62/115; 252/68
(58) Field of Search ........................... 252/68; 62/114, 62/115

(56) References Cited

U.S. PATENT DOCUMENTS

| | | | |
|---|---|---|---|
| 4,138,855 A | 2/1979 | Jahan et al. ............. 62/112 |
| 4,198,313 A | 4/1980 | Bargigia et al. ......... 252/305 |
| 4,272,960 A | 6/1981 | Wahl, III ............... 60/641 D |
| 4,482,465 A | 11/1984 | Gray ..................... 252/67 |
| 4,810,403 A | 3/1989 | Bivens et al. ............. 252/67 |
| 4,941,986 A | 7/1990 | Jolly .................. 252/51.5 R |
| 4,944,890 A | 7/1990 | Deeb et al. ................ 252/54 |
| 5,026,497 A | 6/1991 | Merchant ................. 252/171 |
| 5,080,823 A | 1/1992 | Arnaud et al. ............ 252/172 |
| 5,108,637 A | 4/1992 | Pearson .................. 252/67 |
| 5,182,040 A | 1/1993 | Bartlett et al. ............ 252/67 |
| 5,304,320 A | 4/1994 | Barthelemy et al. ........ 252/67 |
| 5,360,566 A | 11/1994 | Stevenson ................ 252/67 |
| 5,370,812 A | 12/1994 | Brown .................... 252/68 |
| 5,417,871 A | 5/1995 | Minor et al. ............. 252/67 |
| 5,425,890 A | 6/1995 | Yudin et al. .............. 252/67 |
| 5,458,798 A | 10/1995 | Lunger et al. ............ 252/67 |
| 5,622,644 A | 4/1997 | Stevenson et al. ......... 252/67 |
| 5,624,596 A | * 4/1997 | Lunger et al. ............ 252/68 |
| 5,626,790 A | 5/1997 | Minor .................... 252/67 |
| 5,672,293 A | 9/1997 | Minor et al. ............. 252/67 |
| 5,785,883 A | 7/1998 | Minor et al. ............. 252/67 |
| 6,106,740 A | 8/2000 | Powell et al. ............. 252/67 |
| 6,117,356 A | 9/2000 | Powell et al. ............. 252/67 |

FOREIGN PATENT DOCUMENTS

| | | | | |
|---|---|---|---|---|
| DE | 41 16 274 C2 | 11/1992 | ............ C09K/5/04 |
| EP | 0 430 169 A1 | 6/1991 | ............ C09K/5/04 |
| EP | 0 430 169 B1 | 6/1991 | ............ C09K/5/04 |
| EP | 0 509 673 A1 | 10/1992 | ............ C09K/5/04 |
| EP | 0 539 952 A1 | 5/1993 | ............ C09K/5/04 |
| EP | 0 608 164 A1 | 7/1994 | ............ A62B/35/04 |
| EP | 0 659 862 A1 | 6/1995 | ............ C09K/5/04 |
| EP | 0 659 862 B1 | 6/1995 | ............ C09K/5/04 |
| EP | 0 565 265 B1 | 10/1995 | ............ C09K/5/04 |
| EP | 0 720 639 B1 | 7/1996 | ............ C09K/5/04 |
| JP | 04018484 A2 | 7/1995 | |
| JP | 07173462 A2 | 7/1995 | |
| JP | 08143696 A2 | 6/1996 | |
| JP | 08170074 A2 | 7/1996 | |
| JP | 11-181414 | 7/1999 | ............ C09K/5/04 |
| WO | WO 92/11339 | 7/1992 | ............ C09K/5/04 |
| WO | WO 92/16597 | 10/1992 | ............ C09K/5/04 |
| WO | WO 94/26835 | 11/1994 | ............ C09K/5/04 |
| WO | WO 95/08602 | 3/1995 | ............ C09K/5/04 |
| WO | WO 96/03473 A1 | 2/1996 | ............ C09K/5/04 |
| WO | 9707179 A1 | 2/1997 | |
| WO | WO 97/15637 | 5/1997 | ............ C09K/5/04 |
| WO | WO 98/08912 | * 3/1998 | ............ C09K/5/04 |

* cited by examiner

Primary Examiner—Yogendra N. Gupta
Assistant Examiner—Eisa B Elhilo
(74) Attorney, Agent, or Firm—Beyer Weaver & Thomas LLP

(57) ABSTRACT

A refrigerant composition comprising 1,1,1,2-tetafluoroethane (R134a) butane and pentane wherein the weights of butane, pentane and R134a are in the range:

| | |
|---|---|
| Pentane and butane | 1–5% |
| R134a | 99–95% |

7 Claims, No Drawings

R 12 REPLACEMENT REFRIGERANT

This is a Continuation-in-part application of prior application Ser. No. 09/570,829 filed on May 12, 2000, which claims priority of Provisional Application No. 60/157,692 filed on Oct. 4, 1999.

This invention relates to a refrigerant particularly but not exclusively for air conditioning systems. The system relates especially to refrigerant compositions which have no adverse effect on the atmospheric ozone layer and to compositions which can be added to existing refrigerants which are compatible with lubricants commonly used in refrigeration and air conditioning systems. The invention also relates to a method of modifying refrigeration and air conditioning systems.

Chlorofluorocarbons (CFCs) eg CFC 11 and CFC 12 are stable, of low toxicity and non-flammable providing low hazard working conditions used in refrigeration and air conditioning systems. When released they permeate into the stratosphere and attack the ozone layer which protects the environment from damaging effects of ultraviolet rays. The Montreal Protocol, an International environmental agreement signed by over 160 countries, mandates the phase-out of CFCs according to an agreed timetable. This now includes hydrochlorofluorocarbons (HCFCs) which also have an adverse effect on the ozone layer.

Any replacement for R 12 must have no ability to deplete ozone. The compositions of the present invention do not include chlorine atoms and consequently they will have no deleterious effect on the ozone layer while providing a similar performance as a working fluid to R 12 in refrigeration apparatus.

Various terms have been used in patent literature to describe refrigerant mixtures. These may be defined as follows:

Zeotrope: A fluid mixture whose vapour and liquid compositions are different at a specified temperature.

Temperature glide: If a zeotropic liquid is distilled at constant pressure its boiling point will increase. The change in boiling point from the beginning of the distillation until the point when a liquid phase has just disappeared is called the temperature glide. A glide is also observed when the saturated vapour of a zeotrope is condensed at constant pressure.

Azeotrope: A fluid mixture of specified composition whose vapour and liquid compositions are the same at a specified temperature. Strictly speaking a fluid mixture which is an azeotrope under for example evaporator conditions, cannot also be an azeotrope under the condenser conditions. However the refrigeration literature may describe a mixture as azeotropic provided that it meets the above definition at some temperature within its working range.

Near-azeotropes: A blend which boils over a small temperature range, that has a small temperature glide.

Retrofit refrigerant mixture: A non-chlorine-containing mixture used to replace completely the original CFC or HCFC refrigerant.

Extender refrigerant mixture: A non-chlorine-containing mixture added during servicing to the CFC or HCFC refrigerant remaining in a unit, that is a top up refrigerant to make good any leakage.

Hermetic compressor: A compressor where the electric motor is in the same totally welded casing as the compressor. The motor is cooled by the refrigerant vapour returning to the compressor. The heat generated by the motor is removed through the condenser.

Semi-hermetic compressor: Similar to a hermetic compressor, the major difference being the casing has a bolted joint which can be opened to enable the motor and compressor to be serviced.

Open compressor: A compressor which is driven by an external motor via a drive shaft passing through the compressor casing. The motor heat is dissipated directly to the environment, not via the condenser. This results in a slightly more efficient performance than a hermetic compressor, but refrigerant leaks can occur at the shaft seal.

Percentages and proportions referred to in this specification are by weight unless indicated otherwise. Percentages and proportions are selected to total 100%.

According to a first aspect of the present invention a refrigerant composition comprises 1,1,1,2-tetrafluoroethane (R 134a) and pentane wherein the weights of pentane and R 134a are in the range

| | |
|---|---|
| Pentane | 1–5% |
| R 134a | 99–95% |

The preferred weights of pentane and R134a are in the range

| | |
|---|---|
| Pentane | 2–3% |
| R 134a | 98–97% |

Positive displacement compressors, that is reciprocating or rotary compressors, used in refrigeration systems suck in small amounts of lubricant from the crank case which are ejected with the refrigerant vapour through the exhaust valves. In order to maintain compressor lubrication this oil must be forced around the circuit by the refrigerant stream and returned to the crank case. CFC and HCFC refrigerants are miscible with hydrocarbon oils and hence carry the oils around the circuit. However HFC refrigerants and hydrocarbon lubricants have low mutual solubilities so effective oil return may not occur. The problem is particularly acute in evaporators where low temperatures can increase the viscosities of oils sufficiently to prevent them being carried along the tube walls. With CFCs and HCFCs enough refrigerant remains in the oil to reduce the viscosities to enable oil return to occur.

When using HFCs with hydrocarbon lubricants oil return can be facilitated by introducing into the system a hydrocarbon fluid having the following properties:

(a) sufficient solubility in the lubricant at the evaporator temperature to reduce its viscosity; and (b) sufficient volatility to allow distillation from the hot lubricant in the compressor crank case.

Hydrocarbons fulfill these requirements.

Preferred hydrocarbons additives are selected from the group consisting of: n-pentane, cyclopentane, isopentane and mixtures thereof Use of n-pentane, isopentane or mixtures thereof is especially preferred.

The amount of pentane may be up to 5%, preferably 1 to 5% and more preferably about 2–3%.

An additional hydrocarbon may be employed for example: 2-methylpropane, 2,2-dimethylpropane, butane, pentane, 2-methylbutane, cyclopentane, hexane, 2-methylpentane, 3-methylpentane, 2,2-dimethylbutane and methylcyclopentane. Use of butane is preferred. Use of a lower boiling hydrocarbon boosts capacity and enhances oil return. The total amount of pentane and additional hydrocarbons may be selected to equal the amounts of pentane set out above.

In particularly embodiments of the invention a mixture of pentane, preferably n-pentane, isopentane or a mixture hereof together with butane is employed. This provides the advantage that a close boiling or near azeotropic blend may be obtained so that formation of a flammable high proportion of pentane is avoided in the event of leakage, for example from a storage cylinder.

Relative proportions of the pentane and butane components may be selected to give a total of 0.2 to 5% of the composition, preferably 2 to 4%, more preferably 3 to 4%. An amount of pentane, preferably isopentane of 0.2 to 2% may be used together with a corresponding amount of 4.8 to 3% of butane in a composition containing a total of 5?% hydrocarbon. In compositions with less than 5% hydrocarbon, for example 1% or 4%, relatively larger ratios of butane: pentane may be employed to minimise hydrocarbon build-up on leakage. Flammability risks ae therefore reduced.

A particularly preferred compositions comprises:

| | |
|---|---|
| R 134a | 96–97% |
| Pentane/butane mixture | 3–4% |

A ratio of pentane/butane of 1:3 to 1:8, preferably about 1:5 may be employed.

Refrigerant compositions in accordance with this invention confer several advantages. The presence of pentane in the mixture increases the solubility properties of the mixture with traditional lubricants, for example mineral and alkyl benzene oils.

The present invention may confer a number of benefits in comparison to R 12 including lower intrinsic global warming potential and lower discharge temperature. The present invention may confer a number of benefits in comparison to pure R 134a including greater miscibility and higher solubility in hydrocarbon oils and hence better oil return.

The invention is further described by means of examples but not in any limitative sense.

EXAMPLE 1

The performance of five R134a/pentane compositions was evaluated using standard refrigeration cycle analysis techniques in order to assess their suitability as retrofit replacements for R12 in hermetic or semi-hermetic systems.

The operating conditions used for the analyses were chosen as being typical of the conditions found in refrigeration systems. Since the blends were zeotropes the midpoints of their temperature glides in the evaporator and condenser were chosen to define the temperature limits of the cycle. The same temperatures were also used to generate performance data from R12.

The following refrigerant compositions were subjected to cycle analysis:

1. A composition comprising 1% pentane, 99% 134a
2. A composition comprising 2% pentane, 98% 134a
3. A composition comprising 3% pentane, 97% 134a
4. A composition comprising 4% pentane, 96% 134a
5. A composition comprising 5% pentane, 95% 134a The following cycle conditions were used in the analysis:

| | |
|---|---|
| COOLING DUTY DELIVERED | 10 kW |
| EVAPORATOR | |
| Midpoint fluid evaporation temperature | −20° C. |
| Superheating | 5.0° C. |
| Suction line pressure drop (in saturated temperature) | 1.5° C. |
| CONDENSER | |
| Midpoint fluid condensing temperature | 45.0° C. |
| Subcooling | 5.0° C. |
| Discharge line pressure drop (in saturated temperature) | 1.5% |
| LIQUID LINE/SUCTION LINE HEAT EXCHANGER | |
| Efficiency | 0.3% |
| COMPRESSOR | |
| Electric motor efficiency | 0.85 |
| Compressor isentropic efficiency | 0.7 |
| Compressor volumetric efficiency | 0.82 |
| PARASITIC POWER | |
| Evaporator fan | 0.3 kW |
| Condenser fan | 0.4 kW |
| Controls | 0.1 kW |

The results of analysing the performances in a refrigeration unit using these operating conditions are shown in Table 1. For comparison the performance of R12 is also shown. All compositions have lower discharge temperatures than R12 and are therefore superior on this account. However with higher pentane contents the cooling capacity is reduced so compositions with the minimum adequate pentane content to ensure oil return are preferred, notably those with between 2 and 3%.

TABLE 1

| Refrigerant % by weight | 1. 134a/pentane 99/1 | 2. 134a/pentante 98/2 | 3. 134a/pentane 97/3 | 4. 134a/pentane 96/4 | 5. 134a/pentane 95/5 | R-12 |
|---|---|---|---|---|---|---|
| Discharge pressure (bar) | 11.77 | 11.49 | 11.20 | 10.91 | 10.63 | 11.21 |
| Discharge temperature (° C.) | 118 | 119 | 119 | 120 | 121 | 128 |
| COP (system) | 1.34 | 1.34 | 1.34 | 1.34 | 1.33 | 1.36 |
| Capacity (kW/m$^3$) | 633 | 613 | 590 | 566 | 542 | 698 |
| Glide in evaporator | 0.97 | 2.10 | 3.40 | 4.87 | 6.49 | 0 |
| Glide in condenser (° C.) | 0.91 | 1.88 | 2.91 | 3.99 | 5.13 | 0 |

EXAMPLE 2

The performance of five R134a/pentane compositions was evaluated using standard refrigeration cycle analysis in order to assess their suitability as retrofit replacements for R12 in open systems. The operating conditions, used for the analyses were chosen as being typical of conditions found in refrigeration systems. Since the blends were zeotropes the midpoints of their temperature glides in the evaporator and condenser were chosen to define the temperature limits of the cycle. The same temperatures were also used to generate performance data for R12.

The following compositions were subjected to cycle analysis;
1. A composition comprising 1% pentane, 99% 134a
2. A composition comprising 2% pentane, 98% 134a
3. A composition comprising 3% pentane, 97% 134a
4. A composition comprising 4% pentane, 96% 134a
5. A composition comprising 5% pentane, 95% 134a The following cycle conditions were used in the analysis:

| | |
|---|---|
| COOLING DUTY EVAPORATOR | 10 kW |
| Midpoint fluid evaporation temperature | −10.0° C. |
| Superheating | 5.0° C. |
| Suction line pressure drop (in saturated temperature) | 1.5° C. |
| CONDENSER | |
| Midpoint fluid condensing temperature | 45.0° C. |
| Subcooling | 5.0° C. |
| Discharge line pressure drop (in saturated temperature) | 1.5% |
| LIQUID LINE/SUCTION LINE HEAT EXCHANGER | |
| Efficiency | 0.3% |
| COMPRESSOR | |
| Electric motor efficiency | 0.85 |
| Compressor isentropic efficiency | 0.7 |
| Compressor volumetric efficiency | 0.82 |
| PARASITIC POWER | |
| Evaporator fan | 0.3 kW |
| Condenser fan | 0.4 kW |
| Controls | 0.1 kW |

The results of analysing the performances in an air-conditioning unit using these operating conditions are shown in Table 2. For comparison the performance of R12 is also shown. All compositions have lower discharge temperatures than R12 and are therefore superior on this account. However with higher pentane contents the cooling capacity is reduced so compositions with the minimum adequate pentane content to ensure oil return are preferred, notably those with between 2 and 3%

EXAMPLE 3

The performance of five R134a/pentane compositions was evaluated using standard refrigeration cycle analysis in order to assess their suitability as retrofit replacements for R12 in mobile air conditioning systems. The operating conditions used for the analyses were chosen as being typical of conditions found in refrigeration systems. Since the blends were zeotropes the midpoints of their temperature glides in the evaporator and condenser were chosen to define the temperature limits of the cycle. The same temperatures were also used to generate performance data for R12

The following refrigerant compositions were subjected to cycle analysis:

1. A composition comprising 1% pentane, 99% 134a
2. A composition comprising 2% pentane, 98% 134a
3. A composition comprising 3% pentane, 97% 134a
4. A composition comprising 4% pentane, 96% 134a
5. A composition comprising 5% pentane, 95% 134a The following cycle conditions were used in the analysis:

| | |
|---|---|
| COOLING DUTY DELIVERED EVAPORATOR | 10 kW |
| Midpoint fluid evaporation temperature | 7.0° C. |
| Superheating | 5.0° C. |
| Suction line pressure drop (in saturated temperature) | 1.5° C. |
| CONDENSER | |
| Midpoint fluid condensing temperature | 60.0° C. |
| Subcooling | 5.0° C. |
| Discharge line pressure drop (in saturated temperature) | 1.5% |
| COMPRESSOR | |
| Compressor isentropic efficiency | 0.7 |
| Compressor volumetric efficiency | 0.82 |
| PARASITIC POWER | |
| Condenser fan | 0.4 Kw |

The results of analysing the performances in an air-conditioning unit using these operating conditions are shown int Table 3. For comparison the performance of R12 is also shown. All compositions have lower discharge temperatures than R12 and are therefore superior on this account. However with higher pentane contents the cooling capacity is reduced so compositions with the minimum adequate content to ensure oil return are preferred, notably those with between 2 and 3%.

TABLE 2

| Refrigerant % by weight | 1. 134a/pentane 99/1 | 2. 134a/pentante 98/2 | 3. 134a/pentane 97/3 | 4. 134a/pentane 96/4 | 5. 134a/pentane 95/5 | R-12 |
|---|---|---|---|---|---|---|
| Discharge pressure (bar) | 11.77 | 11.49 | 11.20 | 10.91 | 10.63 | 11.21 |
| Discharge temperature (° C.) | 89.7 | 90.0 | 90.4 | 90.9 | 91.5 | 94.8 |
| COP (system) | 2.544 | 2.54 | 2.54 | 2.54 | 2.53 | 2.57 |
| Capacity (kW/m$^3$) | 1051 | 1020 | 987 | 953 | 917 | 1111 |
| Glide in evaporator | 0.97 | 2.08 | 3.32 | 4.69 | 6.20 | 0.00 |
| Glide in condenser (° C.) | 0.91 | 1.88 | 2.91 | 3.99 | 5.13 | 0.00 |

TABLE 3

| Refrigerant % by weight | 1. 134a/pentane 99/1 | 2. 134a/pentante 98/2 | 3. 134a/pentane 97/3 | 4. 134a/pentane 96/4 | 5. 134a/pentane 95/5 | R-12 |
|---|---|---|---|---|---|---|
| Discharge pressure (bar) | 17.04 | 16.65 | 16.27 | 16.27 | 15.51 | 15.72 |
| Discharge temperature (° C.) | 84.4 | 85.3 | 85.9 | 85.9 | 87.4 | 88.4 |
| COP (system) | 2.38 | 2.38 | 2.38 | 2.38 | 2.38 | 2.45 |
| Capacity (kW/m$^3$) | 1730 | 1687 | 1643 | 1643 | 1552 | 1754 |
| Glide in evaporator | 0.91 | 1.91 | 3.02 | 3.02 | 5.52 | 0.00 |
| Glide in condenser (° C.) | 0.83 | 1.71 | 2.64 | 2.64 | 4.63 | 0.00 |

EXAMPLE 4

The performance of two R134a/pentane/butane compositions was evaluated using standard refrigeration cycle analysis techniques in order to assess their suitability as retrofit replacements for R12 in hermetic or semi-hermetic systems. The operating conditions used for the analyses were chosen as being typical of conditions found in refrigeration systems. Since the blends were zeotropes the midpoints of their temperature glides in the evaporator and condenser were chosen to define the temperature limits of the cycle. The same temperatures were also used to generate performance data for R12.

The following refrigerant compositions were subjected to cycle analysis:
1. A composition comprising 1% pentane, 2.5% butane, 96.5% 134a
2. A composition comprising 1.7% pentane, 2.6% butane, 95.7% 134a.

The following cycle conditions were used in the analysis:

| COOLING DUTY DELIVERED EVAPORATOR | 10 kW |
|---|---|
| Midpoint fluid evaporation temperature | 7–20° C. |
| Superheating | 5.0° C. |
| Suction line pressure drop (in saturated temperature) | 1.5° C. |
| CONDENSER | |
| Midpoint fluid condensing temperature | 45.0° C. |
| Subcooling | 5.0° C. |
| Discharge line pressure drop (in saturated temperature) | 1.5% |
| LIQUID LINE/SUCTION LINE HEAT EXCHANGER | |
| Efficiency | 0.3 |
| COMPRESSOR | |
| Electric motor efficiency | 0.85 |
| Compressor isentropic efficiency | 0.7 |
| Compressor volumetric efficiency | 0.82 |
| PARASITIC POWER | |
| Evaporator fan | 0.3 kW |
| Condenser fan | 0.4 kW |
| Controls | 0.1 kW |

The results of analysing the performances in a refrigeration unit using these operating conditions are shown in Table 1. For comparison the performance of R12 is also shown. All compositions have lower discharge temperatures than R12 and are therefore superior on this account. However with higher pentane contents the cooling capacity is reduced so compositions with the minimum adequate pentane content to ensure oil return are preferred, notably those with between 2 and 3%

TABLE 4

| Refrigerant % by weight | Pentane butane 134a | 1.0 2.5 96.5 | Pentane butane 134a | 1.0 2.6 95.7 | R-12 |
|---|---|---|---|---|---|
| Discharge pressure (bar) | | 11.24 | | 11.04 | 11.21 |
| Discharge temperature (° C.) | | 118 | | 119 | 128 |
| COP (system) | | 1.34 | | 1.34 | 1.36 |
| Capacity (kW/m$^3$) | | 631 | | 616 | 698 |
| Glide in evaporator (° C.) | | 1.09 | | 1.96 | 0 |
| Glide in condenser (° C.) | | 1.03 | | 1.77 | 0 |

EXAMPLE 5

The performance of two R134a/pentane/isobutane compositions were evaluated using standard refrigeration cycle analysis techniques in order to assess their suitability as retrofit replacements for R12 in hermetic or semi-hermetic systems. The operating conditions used for the analyses were chosen as being typical of conditions found in refrigeration systems. Since the lends were zeotropes the midpoints of their temperature glides in the evaporator and condenser were chosen to define the temperature limits of the cycle. The same temperatures were also used to generate performance data for R12.

The following refrigerant compositions were subjected to cycle analysis:
3. A composition comprising 1.7% pentane, 1.9% isobutane, 96.4% 134a
4. A composition comprising 1.7% pentane, 1.1% isobutane, 97.2% 134a The following cycle conditions were used in the analysis:

| COOLING DUTY DELIVERED EVAPORATOR | 10 kW |
|---|---|
| Midpoint fluid evaporation temperature | 7–20° C. |
| Superheating | 5.0° C. |
| Suction line pressure drop (in saturated temperature) | 1.5° C. |
| CONDENSER | |
| Midpoint fluid condensing temperature | 45.0° C. |
| Subcooling | 5.0° C. |
| Discharge line pressure drop (in saturated temperature) | 1.5% |
| LIQUID LINE/SUCTION LINE HEAT EXCHANGER | |
| Efficiency | 0.3 |

-continued

| COMPRESSOR | |
|---|---|
| Electric motor efficiency | 0.85 |
| Compressor isentropic efficiency | 0.7 |
| Compressor volumetric efficiency | 0.82 |
| PARASITIC POWER | |
| Evaporator fan | 0.3 kW |
| Condenser fan | 0.4 kW |
| Controls | 0.1 kW |

The results of analysing the performances in a refrigeration unit using these operating conditions are shown in Table 1. For comparison the performance of R12 is also shown. All compositions have lower discharge temperatures than R12 and are therefore superior on this account.

TABLE 5

| Refrigerant % by weight | Pentane isobutane 134a | 1.7 1.9 96.4 | Pentane isobutane 134a | 1.7 1.1 97.2 | R-12 |
|---|---|---|---|---|---|
| Discharge pressure (bar) | 11.73 | | 11.67 | | 11.21 |
| Discharge temperature (° C.) | 118 | | 118 | | 128 |
| COP (system) | 1.34 | | 1.34 | | 1.36 |
| Capacity (kW/m$^3$) | 628 | | 624 | | 698 |
| Glide in evaporator (° C.) | 2.13 | | 1.98 | | 0.00 |
| Glide in condenser (° C.) | 1.83 | | 1.74 | | 0.00 |

What is claimed is:

1. A refrigerant composition consisting essentially of 1,1,1,2-tetrafluoroethane (R134a), butane and pentane wherein the weights of butane, pentane and R134a are in the range:

| pentane and butane | 1–5% |
|---|---|
| R134a | 99–95%. |

2. A refrigerant composition as claimed in claim 1, wherein the weights of butane, pentane and R134a are in the range:

| pentane and butane | 2–3% |
|---|---|
| R134a | 98–97%. |

3. A refrigerant composition as claimed in claim 1, wherein the combined weight of pentane and butane is in the range 3–4%.

4. A refrigerant composition as claimed in claim 1, wherein the composition is a zeotrope.

5. A refrigerant composition as claimed in claim 1, wherein the pentane is a mixture of n-pentane and iso-pentane.

6. A refrigerant composition as claimed in claim 3, wherein the pentane is a mixture of n-pentane and iso-pentane.

7. A method of refrigeration comprising condensing and evaporating a composition as claimed in claim 1.

* * * * *